(No Model.) 2 Sheets—Sheet 1.
J. F. MEHREN.
SECONDARY BATTERY.
No. 419,862. Patented Jan. 21, 1890.
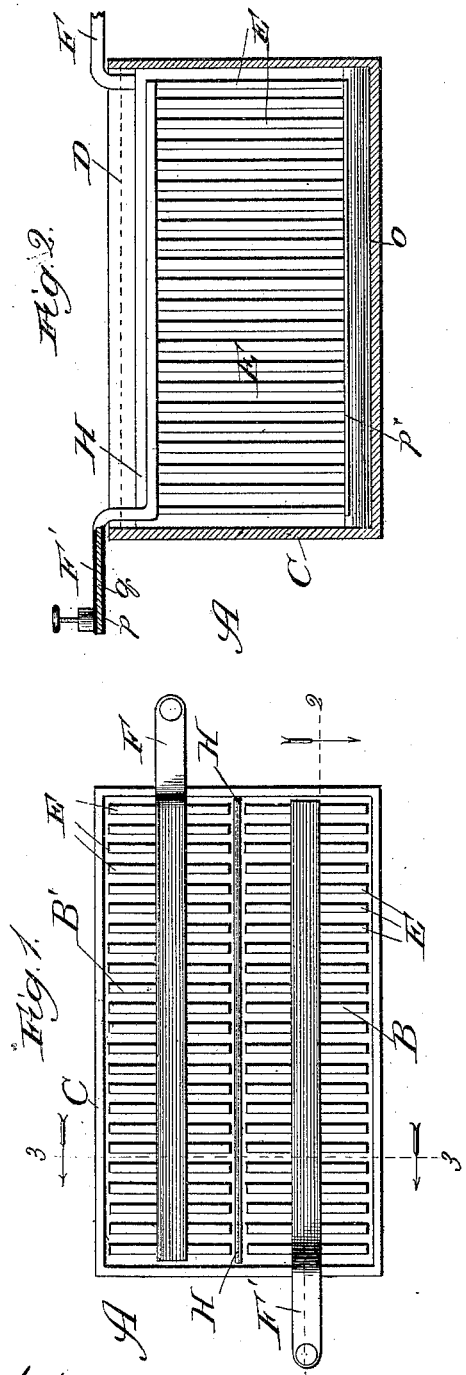
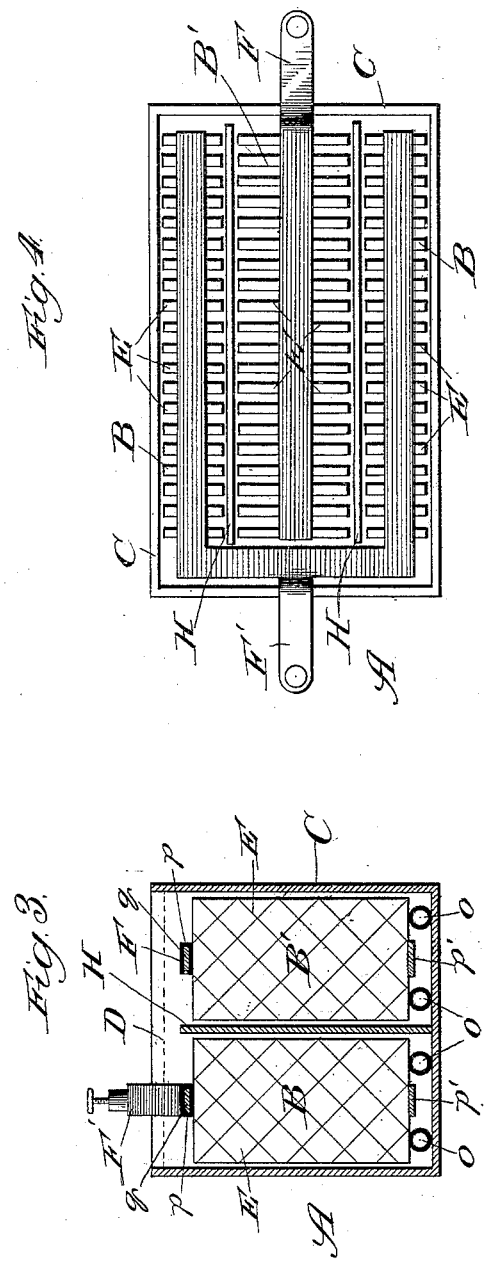
Witnesses:
Chas. E. Gaylord,
J. W. Dyrenforth
Inventor:
Jacob F. Mehren,
By Dyrenforth & Dyrenforth
Attys.

(No Model.)
2 Sheets—Sheet 2.
J. F. MEHREN.
SECONDARY BATTERY.
No. 419,862.
Patented Jan. 21, 1890.
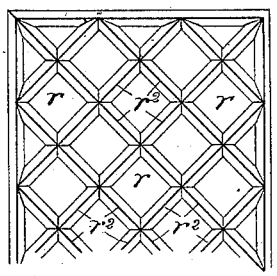
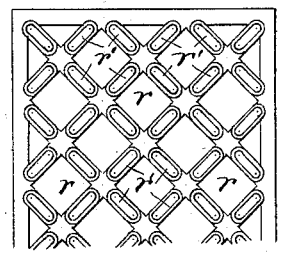
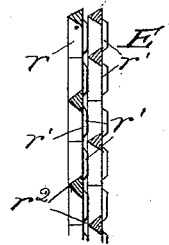
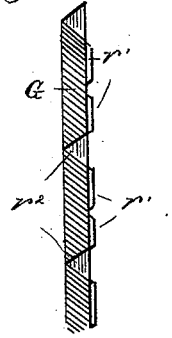
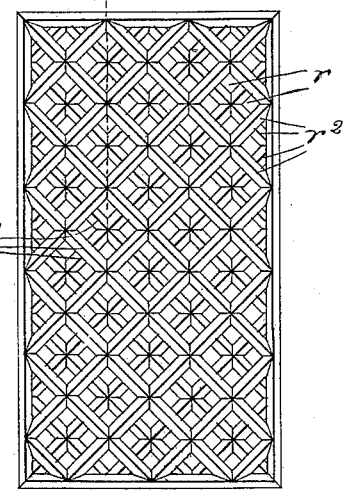
Witnesses:
Inventor:
Jacob F. Mehren,
By Dyrenforth & Dyrenforth,
Att'ys

UNITED STATES PATENT OFFICE.

JACOB F. MEHREN, OF CHICAGO, ILLINOIS.

SECONDARY BATTERY.

SPECIFICATION forming part of Letters Patent No. 419,862, dated January 21, 1890.

Application filed March 12, 1889. Serial No. 302,963. (No model.)

*To all whom it may concern:*

Be it known that I, JACOB F. MEHREN, a citizen of the United States, residing at Chicago, in the county of Cook and State of Illinois, have invented a new and useful Improvement in Electric Batteries, of which the following is a specification.

My invention relates more particularly to improvements in secondary batteries, though details of my improvement may be used to advantage in primary electro-galvanic batteries.

The objects of my invention are to provide for use in galvanic batteries an element of novel construction affording material advantages over other elements hitherto invented, and to provide a secondary battery of generally improved construction and of increased efficiency over such batteries as hitherto constructed.

In the accompanying drawings, Figure 1 is a plan view of a secondary battery involving my improvements; Figs. 2 and 3, respectively, a vertical and a transverse section of the same; Fig. 4, a view like that presented in Fig. 1, but showing a different disposition of the plates forming the positive element of the battery; Fig. 5, an enlarged broken face view of one of the perforated plates or supports for the active material; Fig. 6, a similar view of the same, showing the rear side thereof; Fig. 7, a broken section taken on the line 7 of Fig. 8; Fig. 8, a face view showing two of the plates or supports adjusted one against the other back to face; and Fig. 9, an enlarged broken sectional view of one of the plates, showing active material in the perforations.

A is a secondary battery, comprising a cell C of usual or desired dimensions, though preferably of greater length than width, and formed of material ordinarily used for the purpose; and B B' are respectively the positive and negative elements of the battery, immersed in a suitable liquid D, contained in the cell and constituting the electrolyte.

The elements B and B' comprise plates or supports E of peculiar construction, and which are formed, preferably, of lead, though they may comprise other material. The plates E should be of rectangular shape, and each is provided throughout its entire extent with quadrilateral openings $r$, extending through the plate, and all flaring from or from near one surface of the plate to the other; and on the rear surface of the plate, or that toward which the openings taper, are ridges or stops $r'$, projecting from between adjacent openings $r$ on the margins or ribs $r^2$ of the openings. The stops $r'$, which should be integral with and composed of the same material as the plate, may be in the form of small buttons or "points," though it is preferred to construct them, as shown, in the form of ridges extending lengthwise of and thus parallel with the lattice strips or margins $r^2$, and each terminating at its opposite ends short of the crossing-points of the adjacent ribs or margins. The plates E are all of the same size, and they are formed alike—that is to say, a margin or rib $r^2$ extends on each one from the upper left-hand corner and one from the upper right-hand corner of the plate (as shown of the upper plate in Fig. 8) diagonally to the respectively opposite edges of the plate, but short of its transverse center, and the openings produced by the other ribs $r^2$, respectively parallel to those extending from the aforesaid corners, are so spaced or rendered of such a size with reference to the length of the plate that none of the ribs $r^2$ below those extending from the said corners coincide with or extend into the corners at the lower end of the plate; hence when two of the plates are adjusted one against the other back to face, if the manner of adjustment were such as to cause the corners of each from which ribs $r^2$ extend, as described, to coincide, all the ribs or margins, and consequently the perforations throughout the two plates, would coincide; but if the adjustment be such as to cause the end of one plate having the margins $r^2$ proceeding from its opposite corners to coincide with the opposite end of the other plate the margins on the two plates will cross each other at right angles, as illustrated in Fig. 8. This last adjustment of the plates one against the other is the manner I observe, for a purpose hereinafter described.

To form each element of the secondary battery A, I place a desired number of the plates E flatwise, together with the ridges $r'$ on the back of each succeedingly-adjusted plate in contact with the face of that previously adjusted and in the manner described to cause such ridges to cross at right angles the ribs $r^2$, bounding the openings of the rear plate, and with the plates so adjusted together I connect them along the edges, which thereby are constituted the upper edge of the element, through the medium of a flat conducting terminal strip, that for the negative element B′ thus forming the positive pole F of the battery, and that for the positive element B the negative pole F′, the manner of connection being preferably by "burning" the strips to the plates. I prefer to form each terminal F and F′ of a central or internal strip $q$ of copper, incased in a shield $p$ of sheet-lead, since thereby are attained pliability and strength with great conductivity. Owing to the comparatively diminutive size of the device as represented in Figs. 1, 2, and 4, which are in the nature of diagrams, the ridges or stops $r'$ are not therein illustrated. The plates should be connected at their opposite or lower edges to prevent any tendency to spread apart toward such edges by means of thin strips $p'$ of sheet-lead, also preferably secured to the plates by burning.

Previous to forming the elements B and B′ by adjusting plates E together in the manner described, each plate has applied mechanically to it over its front surface, or side toward which the openings $r$ flare, an active material, (or material to be rendered active,) the substance I employ for the purpose being comminuted metallic lead G, Fig. 9. The application of the material G on the plate in the manner described constitutes the plate a support for the material since it fills the perforations $r$, which, owing to their shape, prevent the cake of the material in each opening from falling out through the narrow end of the opening, and by adjusting and connecting the plates in the manner described the material G on each plate is prevented from dislodgment by being crossed by the ridges $r'$ of the succeeding plate held against it. It may here be stated that one end plate E of each element need not be provided with the active material G, no provision being made for holding it in.

It will be seen that the ridges $r'$ afford space between the adjacent surfaces of the plates E, thereby permitting, when the elements are immersed to form the battery, free circulation of the electrolytic fluid D to all parts of the surfaces, and as all the ridges extend diagonally upward with reference to the lower end of each plate, and are separated at the junctions of the ribs or margins $r^2$ of the perforations, (which, when constructed as shown, extend each with two of its opposite angles longitudinally of the plate and the other two transversely thereof,) there is no obstruction to the upward passage of gas generated in the fluid by the action of the battery, as there would be were the ridges and margins $r^2$ disposed at right angles to the sides of the plates E; but, on the contrary, the construction aids the shedding of bubbles of the liberated gases.

Two elements B and B′, constructed in the manner described, are placed side by side in a battery-cell C, leaving a narrow space between the adjacent sides of the series of plates, and both are entirely covered (except the terminals, as shown in Fig. 2) by the electrolytic fluid D. The series of plates forming each element should rest upon an elastic support in the bottom of the cell, which support I prefer to provide in the form of tubes $o$ of soft rubber, which tend to prevent injury to the element by jolting of the battery.

Between the elements B and B′, in the narrow space referred to as being provided between them, I place a porous partition or perforated screen H of non-conducting material, thereby affording perfect separation of the two opposite elements and permitting readily, by withdrawing and replacing it successively and from time to time, testing of the space to reassure as to the separation of the two elements and as against any matter having fallen into or accumulated in the space. The plate or partition H, like the rubber tubes $o$, is not an indispensable feature of my improved battery, but is designed to afford precautionary means against short-circuiting where the battery is liable to be subjected to jolting sufficiently to disturb the elements, as in transportation or use on railroad-trains and the like.

Among the more important advantages of my improved construction thus described, especially with reference to the common alternating positive and negative plate form of secondary battery, are that it does not entail great separation between the surfaces of the plates, and therefore permits the employment of more plates within a cell of given size, thereby increasing the extent of exposed surface; that short-circuiting caused in the old form of secondary battery referred to, by buckling of the plates or dropping out of the active material, is entirely obviated, and that the negative element (the plates of which are deformed by expanding and buckling and eventually become completely peroxidized and thus imperfect conductors and have therefore to be discarded) may be removed from the battery without disturbing or injuring the positive element, or vice versa.

Instead of disposing the elements B and B′ in the cell A in the manner described and shown in Fig. 1, they may be arranged as illustrated in Fig. 4, wherein the series of connected plates E, forming the negative element, occupies a position between two positive elements, each formed of a series of plates E one-half or about one-half the dimensions of those of the negative element and having a common terminal F′. The advantage of this arrangement consists in the fact that the internal resistance of the battery is thereby reduced and the negative element is charged more uniformly. It is to be noted, however, and which fact is quite obvious, that in neither of the constructions and arrangements of the elements of my improved battery can buckling of the plates or supports E cause short-circuiting.

While I may employ as the active material or material to be rendered active for my improved battery any of the substances hitherto used for the purpose, I prefer comminuted metallic lead—a material hitherto also used for the purpose—for application to the plates E. The comminuted metallic lead affords advantages over other substances hitherto used in preparing plates for the elements of secondary batteries, commonly oxides of lead, such as minium applied to the plates of both elements, or minium to one and litharge to the other, or litharge to both. With any one of these substances the plates thus prepared require to be subsequently "formed" by reducing the oxide of lead on the plates of one element to spongy lead and raising that on the plates of the other element to peroxide of lead. The operation of "forming" consumes much time and causes the expenditure of considerable electrical energy.

To reduce litharge to spongy lead requires about five times the energy that is required to raise minium to peroxide, and it requires a still greater energy to reduce minium to spongy lead than to reduce litharge to spongy lead, while either the comminuted lead or minium may be raised to peroxide rapidly and with comparatively little expense.

By the use of the comminuted metallic lead G, which I may apply to the plates of both elements of the battery, no further forming of the plates of the positive element is required, since they possess the properties of the spongy-lead plates formed with the other substances referred to. Repeated charging of a battery provided with an element containing plates prepared according to my improvement will, however, effect still further reduction of the comminuted metallic lead. Where the plates of both elements are prepared with the comminuted metallic lead, one is, of course, raised to a peroxide of lead.

The advantages afforded by my improved construction thus described may be stated to be as follows: Exposure of a large extent of surface for a given weight of metal and the attainment thereby of great storing capacity, security of the active material in place against rough handling or jolting of the battery, the utilization of substantially all of the metal employed in the battery as active material by immersing all but short lengths of the terminal strips in the electrolytic fluid, ready substitution of a new element for one rendered worthless or worn out, the maintenance of a perfect permanent separation between the positive and negative elements and capability of readily testing the space between them, thorough circulation of the electrolytic fluid to enable it to have contact with the entire surfaces of the elements and free escape of liberated gases, prevention against short-circuiting by buckling of the plates or supports and the falling from the latter and between the opposite elements of the active material, and the comparatively small cost involved in forming the plates and the electrodes produced with them.

What I claim as new, and desire to secure by Letters Patent, is—

1. A perforated plate for electric batteries, having its perforations flaring in one and the same direction toward one surface of the plate, and provided between perforations on the side toward which they taper with ridges or stops $r'$, substantially as and for the purpose set forth.

2. An electric-battery element having a series of perforated plates held flatwise together in contact with each other, and each having on one surface ridges or stops $r'$, serving to space the plates, substantially as described.

3. An electric-battery element having a series of perforated plates held flatwise together in contact with each other, and each having quadrilateral perforations flaring in one and the same direction toward one surface of the plate, and spacing-ridges or stops $r'$, integral with the plate on the side thereof toward which the perforations taper and extending diagonally on the margins of the perforations, substantially as described.

4. In a secondary battery, an element comprising a series of plates or supports E, held flatwise together in contact with each other, and each having angular perforations flaring in one and the same direction toward one surface of the plate, and spacing-ridges or stops $r'$, integral with the plate on the side thereof toward which the perforations taper, and an active material supported in the flaring perforations of the plates and secured in each plate provided therewith by the ridges $r'$ of a coinciding plate in contact with it, substantially as described.

5. In a secondary battery, the combination, with the cell containing an electrolytic fluid, of positive and negative elements B and B', formed, respectively, with plates or supports E, held flatwise together, the said elements being supported adjacent to each other in the cell and wholly on separate planes, substantially as described.

6. In a secondary battery, the combination, with the cell containing an electrolytic fluid, of a negative element B', formed with a series of plates or supports E, held flatwise together, and a positive element B, comprising two of the said series of plates connected together and supported on opposite sides of the negative element with a space between each and the negative element, substantially as described.

7. In a secondary battery, the combination, with the cell containing an electrolytic fluid, of positive and negative elements B and B', formed, respectively, with plates or supports E, held flatwise together, the said elements being supported adjacent to each other in the cell, and porous partition H of insulating material between the elements, substantially as described.

8. In a secondary battery, the combination, with the cell containing an electrolytic fluid, of an elastic support $o$ in the cell, and positive and negative elements B and B', formed, respectively, with perforated plates or supports E, containing an active material in the perforations and held flatwise together and resting adjacent to each other on the said elastic support in the cell and wholly on different planes, substantially as described.

JACOB F. MEHREN.

In presence of—
  J. W. DYRENFORTH,
  M. J. BOWERS.